No. 796,765. PATENTED AUG. 8, 1905.
G. F. SMITH.
BAKER'S OVEN.
APPLICATION FILED OCT. 18, 1904.

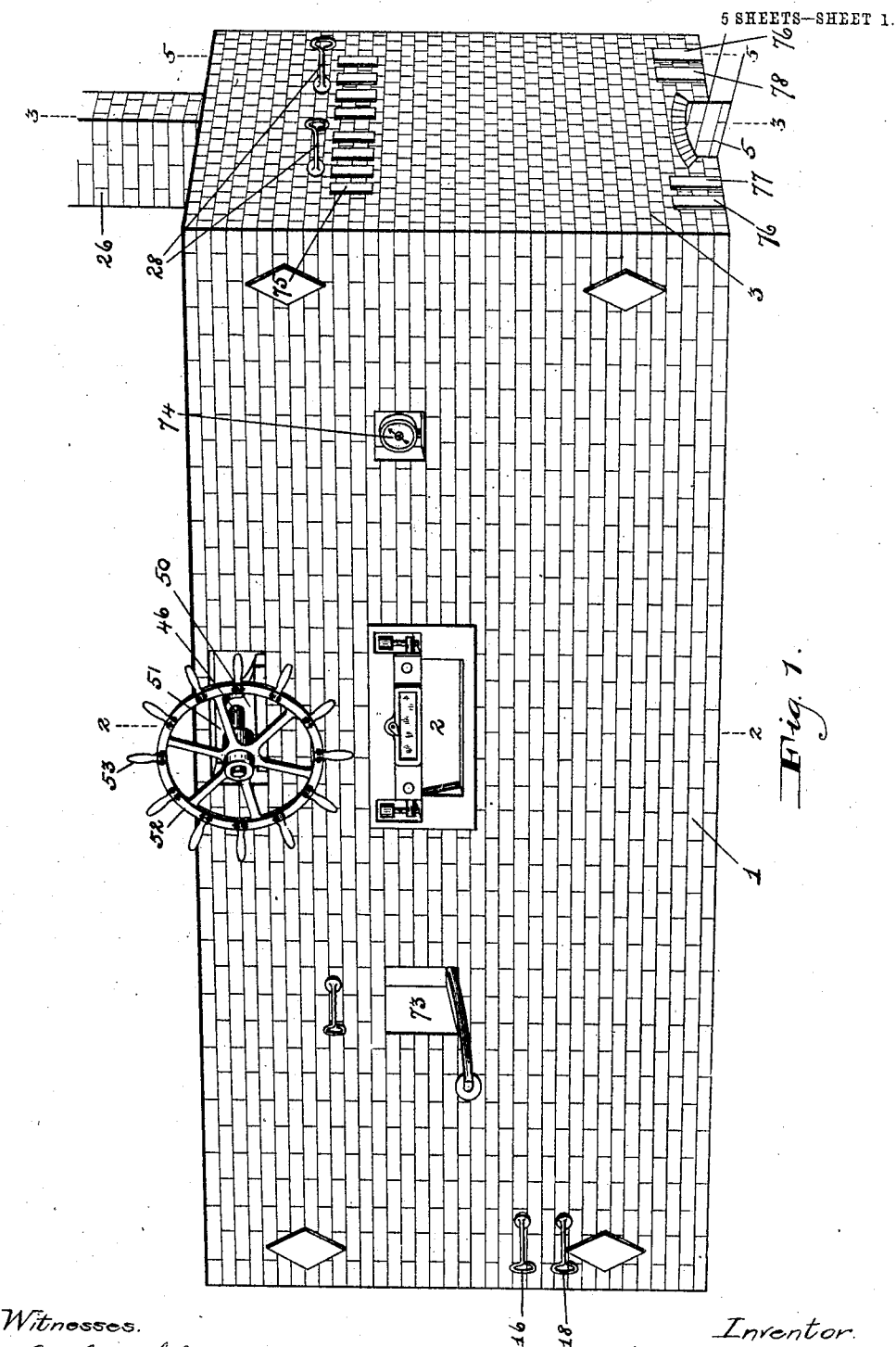

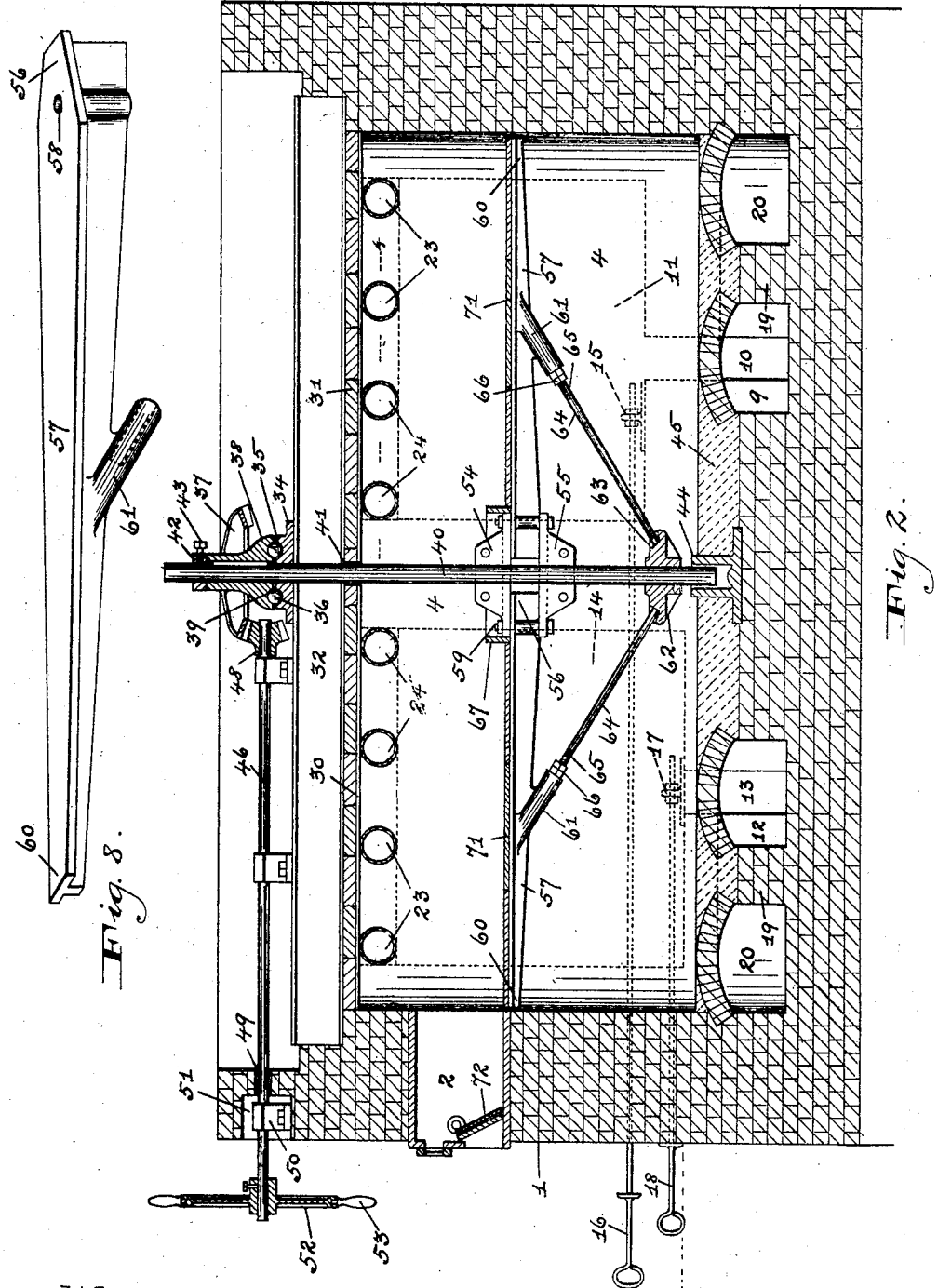

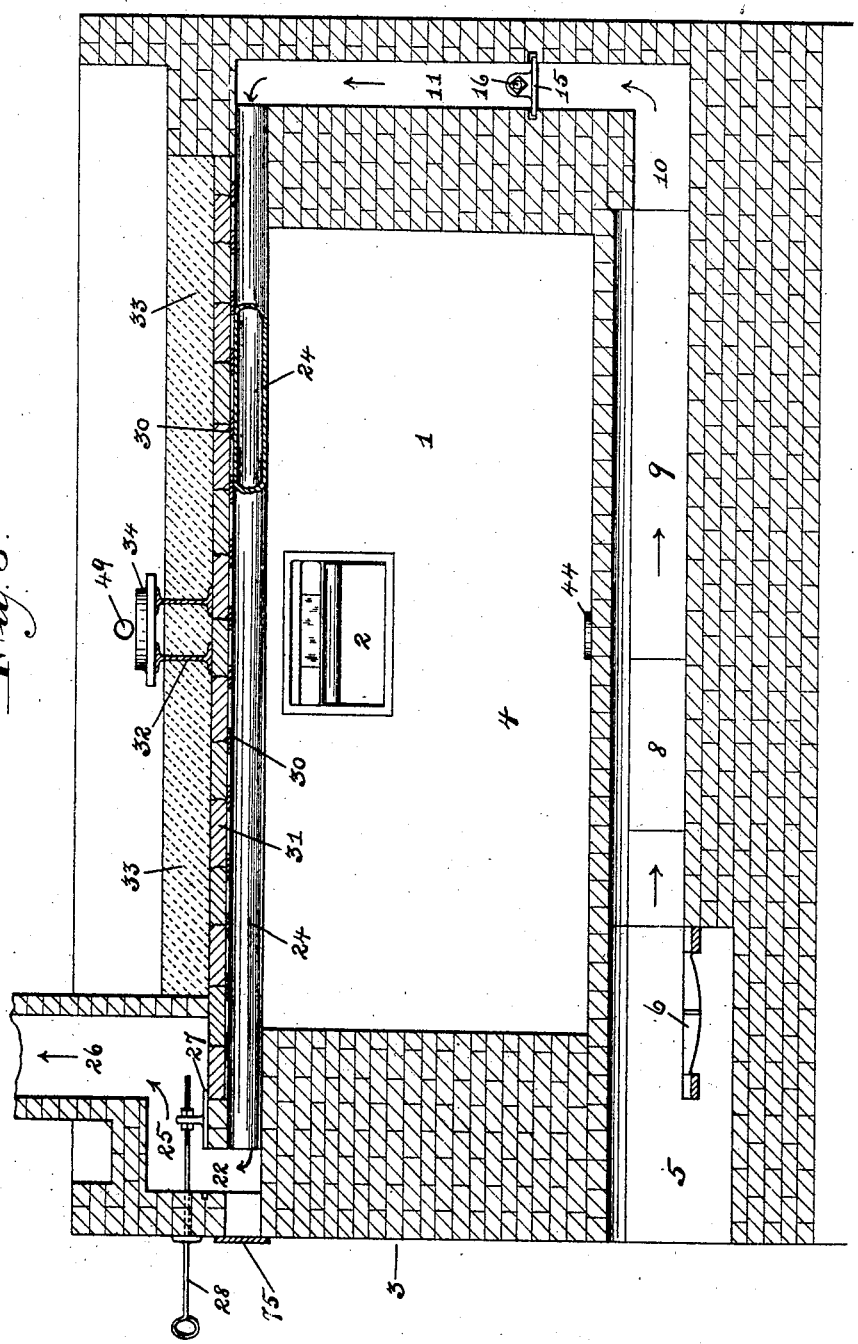

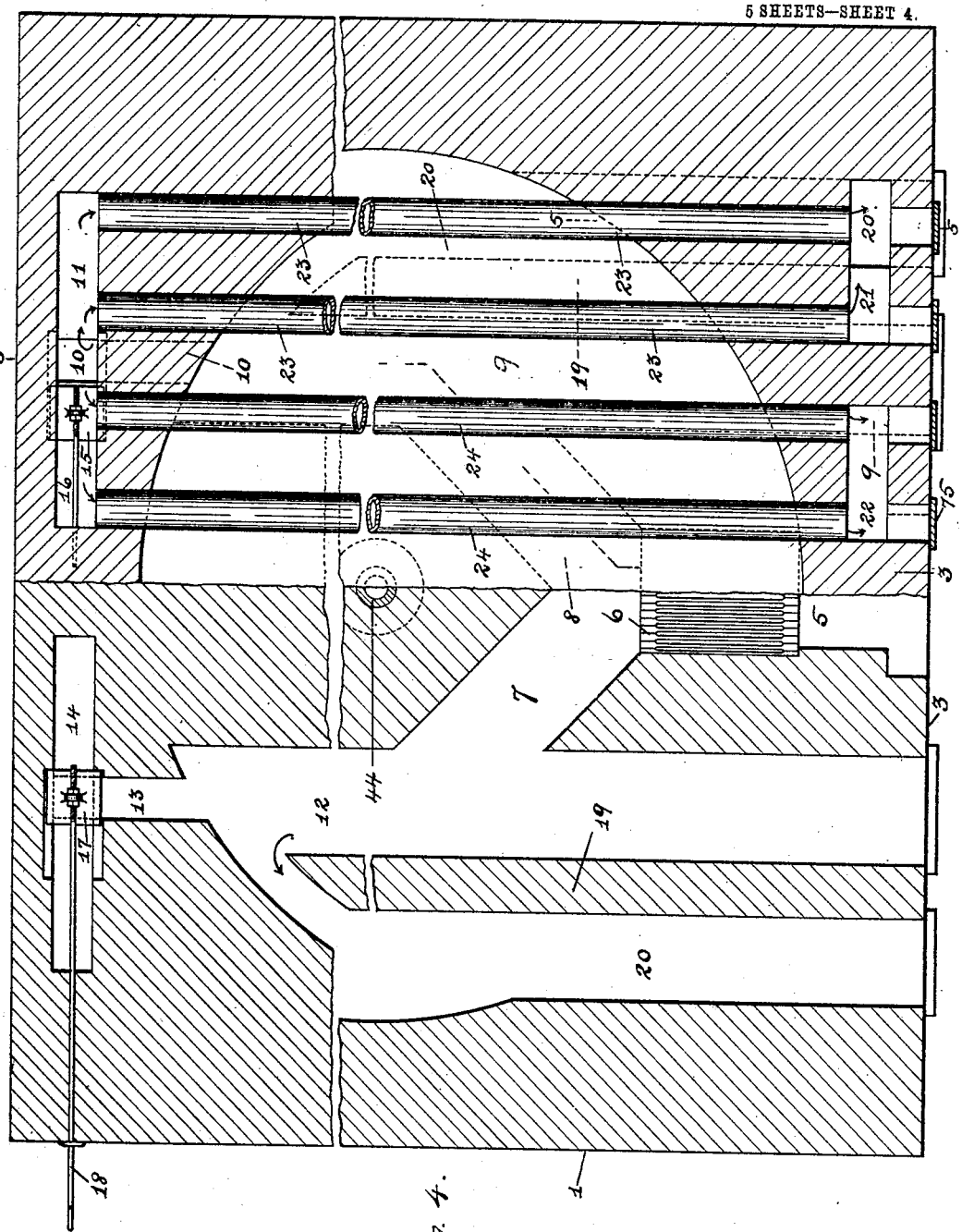

5 SHEETS—SHEET 5.

Witnesses.
J. H. Sirich
G. Ferdinand Vogt

Inventor.
George F. Smith
By Mann & Co,
Attorneys.

UNITED STATES PATENT OFFICE.

GEORGE F. SMITH, OF BALTIMORE, MARYLAND.

BAKER'S OVEN.

No. 796,765. Specification of Letters Patent. Patented Aug. 8, 1905.

Application filed October 18, 1904. Serial No. 228,920.

*To all whom it may concern:*

Be it known that I, GEORGE F. SMITH, a citizen of the United States, residing at Baltimore, in the State of Maryland, have invented certain new and useful Improvements in Bakers' Ovens, of which the following is a specification.

This invention relates to bakers' ovens, and has among its objects to improve the flue construction of ovens whereby the heat may be controlled and distributed to any portion of the oven, as desired, to enable the baking to be done in a uniform manner.

Another object of the invention is to provide a construction of metallic-top flues which will readily radiate the heat and increase the temperature in the oven-chamber without increasing the fuel consumption and also serve to support the upper oven structure.

Another object of the invention is to provide an improved construction of rotary table which may be turned in either horizontal direction and stop at any point desired.

Another object of the invention is to provide an improved support for the table whereby the bearings which sustain it may be on the exterior of the oven and accessible at all times.

Another object is to provide an improved operating device which will enable the table to be turned as readily by either the right or left hand while the operator is making an inspection or handling the contents within the oven.

With these and other objects in view the invention is illustrated in the accompanying drawings, in which—

Figure 6:
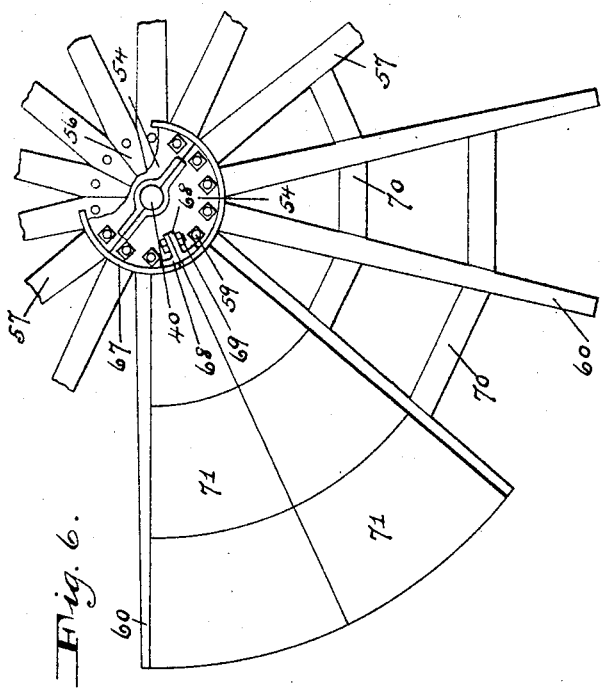
Figure 7:
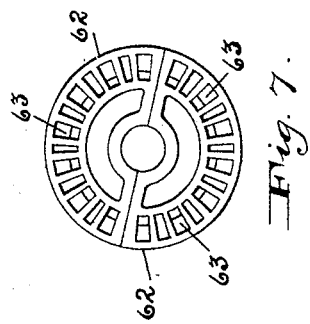
Figure 5:
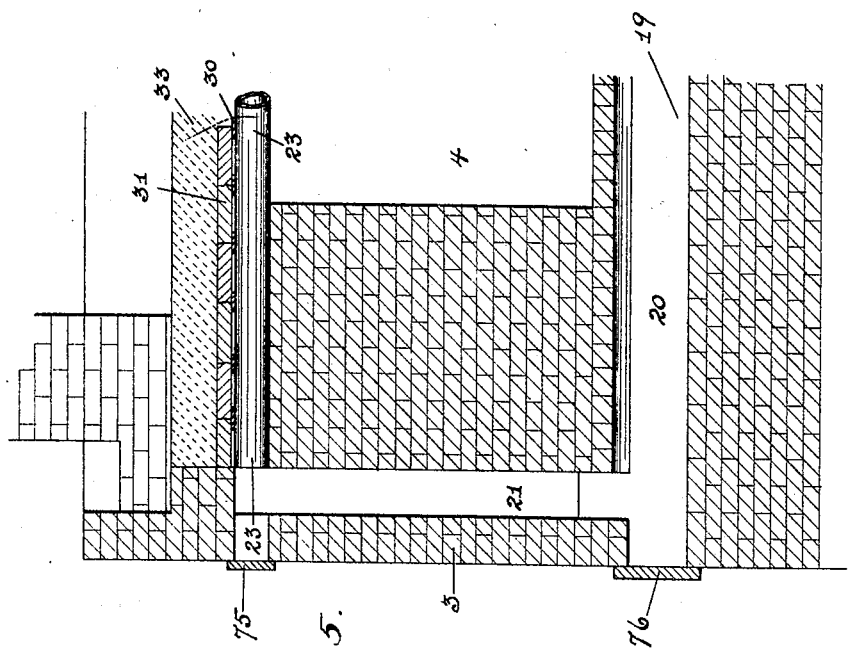

Figure 1 illustrates a perspective exterior view of the oven. Fig. 2 is a central vertical section on the line 2 2 of Fig. 1. Fig. 3 is a vertical section on the line 3 3 of Figs. 1 and 4 looking in a direction toward the oven-door. Fig. 4 is a sectional view taken on two horizontal planes, as indicated by the lines 4 4 on Fig. 2, to show at one side the lower flues and at the other side the upper tubular flues. Fig. 5 is a vertical section through a portion of the oven on lines 5 5 of Figs. 1 and 4. Fig. 6 is a detail plan of the radial arms which support the oven-table. Fig. 7 is a plan view of the recessed collar for receiving the lower ends of the brace-rods, and Fig. 8 is a perspective detail of one of the radial table-arms.

Referring to the drawings by numerals, 1 designates the front wall, in which the doorway 2, opening into the interior, is located, and 3 designates one side wall at the firing end of the oven. The exterior of the oven in the present instance is angular, while the interior 4 is circular.

A fire-box 5 is centrally located at the side 3 of the oven, and said fire-box is provided with grate-bars 6, on which the fire is built. At the inner end of the grate-bars the oven is provided with laterally-extending horizontal flues 7 and 8, which branch off from the fire-box. The flue 8 extends laterally to a point approximately a little to the side of a central point and opens into a straight horizontal flue 9, which extends in a direction parallel with the front wall 1, as seen in full lines in Fig. 3 and broken lines in Fig. 4. This straight flue 9 extends from the firing side 3 toward the opposite side of the oven and at the latter side is confronted by a narrower passage 10, which opens into a wider vertical flue 11 in the wall opposite the side 3. (See Figs. 3 and 4.) The horizontal flue 7 also opens into a straight flue 12, at the end of which is also a narrow passage 13, which communicates with a wide vertical flue 14. A damper 15, attached to a rod 16, is located in the vertical flue 11 to close the upper end of the passage 10, while a similar damper 17 on the end of a rod 18 closes the upper end of the passage 13. A partition 19 extends in a direction parallel with the straight flues 9 and 12, and a return-flue 20 is provided adjacent the front and rear walls, which extends around the partition 19 and communicates with the end of the straight flue 9 and 12. When the damper 17, for example, is closed to cut off communication between the passage 13 and vertical flue 14, the heat will pass from the straight flue 12 around the end of the partition 19 into the return-flue 20 and back toward the firing side wall 3. This latter wall is provided at each side of the fire-box with two vertical flues 21 and 22, as seen in Fig. 4. The vertical flue 21 is in communication at its lower end with the return-flue 20, so that heat conducted through the return-flue toward the firing-wall 3 will be conducted vertically to the flue 21. It is to be understood that both return-flues 20 at opposite sides of the oven are in communication at the firing side 3 with a vertical flue 21. At the upper end the vertical flues 21 communicate with one end of two horizontal metallic tubular flues 23, (see Figs. 4 and 5,) which extend from the firing side 3 through the oven-chamber 4 and at their opposite ends communicate with the vertical flue 11. Adjacent the flues 23 the oven is also provided with parallel metallic return-flues 24, which extend from the vertical flue 11 back to the firing side and open into the vertical flue 22, as seen in Figs. 3 and 4, and said vertical flues 22 are in communication with a passage 25 to the chimney 26. A damper 27 on a rod 28 is located in the passage 25 to regulate the escape to the chimney.

From the foregoing description it will be understood that when the damper 15 (see Fig. 4) is open the heat from the fire on the grate will pass through the lateral flue 8, straight flue 9, passage 10, into vertical flue 11, then from the latter through the metallic flues 23 and 24 back to the firing side 3. The heat passing through the metallic flues 24 will discharge into the vertical flue 22 and from the latter through the passage 25 to the chimney 26, while the heat passing from the flue 11, through the tubes 23, will discharge into the vertical flue 21 and pass downwardly into the return-flue 20 and back into the straight flue 9, thus making a complete circuit. Now if the dampers 15 and 17 are closed all the heat will be retained longer in the oven and will be compelled to pass from the lateral flues 7 and 8 into the straight flues 9 and 12, around the ends of partitions 19, then back by return-flues 20 to the firing side 3, up through the vertical flues 21 to tubes 23, then to the vertical flues 11 on top of the dampers 15 and 17, back again through tubes 24 to the vertical flues 22 in the firing side wall, and then out through passage 25 into the chimney. It will thus be seen that the heat will be made to circulate in one direction through the tubular flues 23 in the top of the oven and returned through the tubular flues 24, also in the top of the oven, and by this course serve to increase the top heat in the oven-chamber 4.

It will be noted that the tubular flues are metal, and therefore readily radiate the heat passing through them, so that considerable heat is gained with a small consumption of fuel, and the oven-chamber will be heated more readily. It will also be noted that the tubular flues 23 and 24 extend from the firing side 3, through the oven-chamber, and into the opposite wall, and that they are located at the top surface of the oven-chamber. This is an important feature, as the tubes are made to serve as supports to sustain the top or roof of the oven, which is subjected to strain, as will now be described.

On top of the tubular flues 23 and 24 and extending in a direction at right angles thereto are a plurality of flat metal bars 30. By reference to Figs. 2, 3, and 5 it will be seen that these bars extend from the front wall 1 toward the opposite wall and rest directly on top of the tubular flues. The bars are spaced slightly from each other, so that the brick roof 31 may rest directly on said bars and be supported by the tubular flues.

Above the tubular flues and extending in a direction at right angles thereto are two parallel I-beams 32. These beams, it will be noted, extend in a direction crosswise of the tubular flues and have their extreme ends supported in the front and opposite rear wall, respectively, while the intermediate portions of said beams rest on the brick roof 31 and are sustained by the tubular flues. It will therefore be understood that the tubular flues perform important functions in the oven structure in addition to their ability to quickly radiate the upper heat in the oven-chamber.

On top of the brick roof 31 the oven is covered with cement 33, which is also filled in between the parallel I-beams, and this cement filling serves to prevent the radiation of the heat from the oven-chamber.

On top of the I-beams and centrally located with respect to the circular oven-chamber is a bearing-plate 34, having a circular groove or channel 35 in its horizontal top surface for the reception of balls 36. Directly over the bearing-plate is a bevel-gear 37, the hub of which at its lower end is flared, as at 38, and is provided with a circular groove 39 to rest on top of the balls 36 in the bearing-plate 34, so that the gear 37 may be supported by an antifriction-bearing while turning in a horizontal plane. A vertical shaft 40 extends through the hub of the bevel-gear and through the bearing-plate 34, and said shaft then passes between the I-beams and through a circular hole 41 in the brick roof down into the oven-chamber. At the upper end the shaft 40 is provided with a collar 42 and a set-bolt 43, which serves to support the shaft entirely from the hub of the bevel-gear, so that the shaft will hang pendent from a bearing wholly on the exterior of the oven. In the practical operation of an oven constructed in accordance with this invention this feature of supporting the shaft by a bearing which is wholly on the exterior has been found to be very advantageous. It removes the bearing from extreme heat and enables it to perform its functions better, permits access to the bearing at all times in order that it may be inspected and lubricated, and enables the shaft to be accurately adjusted. By means of this arrangement costly delays are avoided, such as drawing the fire and putting the oven out of service for days in order to permit it to cool off sufficiently to enable a man to enter the oven to adjust or repair the bearings on the interior. At the lower pendent end the shaft enters a socket or steady-bearing 44, which serves to prevent it from swaying. This steady-bearing is embedded in cement 45, forming the bottom surface of the oven-chamber and covering all the lower horizontal flues.

A horizontal shaft 46 extends through bearings 47 on the I-beams, and at the inner end said shaft carries a bevel-pinion 48, which meshes with the bevel-gear 37 on the pendent vertical shaft. The outer end of the horizontal shaft projects through an opening 49 in the front wall 1 of the oven and is sustained in a bearing 50, mounted in a recess 51 in said wall, and the extreme end of this shaft carries an operating-wheel 52, provided with a plurality of circumferential hand-grips 53, by which the shaft may be turned in either direction and as much or as little as desired, as will presently be explained.

On the interior of the oven and substantially midway between the top and bottom of the oven-chamber the vertical shaft is provided with two upper coupling-heads 54 and two lower coupling-heads 55. These upper and lower coupling-heads are spaced apart to receive between them the beveled inner ends 56 of a plurality of radiating T-shaped beams 57. These beams at their beveled inner ends are provided with vertical bolt-holes 58, through which bolts 59 are passed to secure them between the coupling-heads 54 and 55, and the other ends 60 of said beams terminate at a point adjacent the circular vertical wall of the oven-chamber. On the under or bottom side each beam is provided with a tubular socket 61, which extends downwardly in an inclined direction toward the lower end of the vertical shaft 40.

Adjacent the socket or steady-bearing 44 the shaft 40 carries a sectional circular head 62, which is preferably clamped around the shaft, so as to prevent vertical displacement. This sectional head is provided with a plurality of radial depressions 63.

Inclined rods 64 are provided at their upper ends with screw-threads 65 and adjusting-nuts 66, and these rods are positioned each with its lower end resting in one of the depressions 63 and its upper end inserted in an inclined socket 61 on the bottom of one of the beams 57. When in position, the adjusting-nuts 66 may be turned, so as to press against the end of the socket and enable the outer end of the beam to be adjusted and beveled and also to relieve the inner beveled end from strain.

Surrounding the shaft 40 and the coupling-head 54 is a split-ring band 67, each end of which is provided on its inner wall with an angle-plate 68. When in position, these angle-plates will confront each other, and a bolt 69, passing through both angle-plates, serves to hold the ends of the ring band securely together, as seen in Fig. 6. The ring band rests on the beams 57, and by placing the angle-plates on the interior the exterior of the ring presents a smooth perpendicular wall. A plurality of bridge-bars 70 connect the adjacent radial beams 57 and serve to stiffen the outer ends against lateral strain.

A covering 71 of any suitable material, such as soapstone, and preferably formed in sections is placed on the radial beams 57 and secured thereto in any desired manner, so that when the beams are completely covered a smooth table or carrier is formed on which the baking-pans may be placed.

The front wall 1 of the oven is provided with the usual door 72 and doorway, the bottom surface of which latter is flush or in the same plane with the cover of the table or carrier in the oven-chamber. The front wall is also provided with the usual lamp-opening 73 and indicator or gage 74.

Plates 75 on the firing side wall 3 serve to cover openings which register with the upper tubular flues 23 and 24, and by the removal of these plates these upper flues may be readily cleaned.

At the bottom of the firing side wall are plates 76, 77, and 78, which cover the ends of the bottom flues 20, 12, and 9, respectively.

It will be noted by reference to Figs. 1 and 2 that the hand-wheel 52 has position directly over the oven-door 72, where it can be turned as readily by the right hand as the left while the operator is inspecting the process of baking operations.

It will readily be understood that the turning of the wheel 52 will revolve the horizontal shaft 46 and pinion 48, and thereby impart a rotary motion to the shaft 40 and table or carrier, so as to bring any pan of material in front of the door, where it may be removed or inspected, and the rotation of the table is at all times under control, because it may be operated in either direction.

Having thus fully described my invention, what I claim as new, and desire to secure by Letters Patent, is—

1. An oven having a fire-box at one side, a plurality of lower flues communicating with the fire-box and extending in a direction toward the side opposite the fire-box, a return-flue, 20, communicating with each of said lower flues, vertical flues each communicating with one of the return-flues at the fire-box side of the oven, tubular flues having one end in communication with the vertical flues at the fire-box side and extending from said latter side to the opposite side of the oven and opening into another vertical flue, and a baking-chamber located between the vertical flues in the opposite sides and also between the upper tubular flues and said lower flues.

2. An oven having a fire-box at one side, vertical flues in the wall at the fire-box side, a vertical flue in the wall opposite the fire-box side, a lower flue communicating with the last-named vertical flue and also communicating with the fire-box, a damper to cut off communication between said lower flue and the last-named vertical flue, a return-flue communicating with the lower flue and also with one of the vertical flues in the fire-box side, a baking-chamber above the lower and return flues, tubular flues establishing communication between the single vertical flue at one side and one of the vertical flues at the fire-box side, and tubular flues also communicating with another vertical flue at the fire-box side and also with the single vertical flue at the opposite side.

3. An oven having a fire-box, lower flues leading from the fire-box, a baking-chamber above the lower flues, a circular table in said baking-chamber, vertical flues communicating with the lower flues, tubular flues communicating with the vertical flues and exposed to the interior of the baking-chamber above the circular table and supporting the upper covering of the said chamber, and means for revolving said circular table.

4. An oven having a fire-box, lower flues leading from the fire-box, a baking-chamber, tubular flues extending across the baking-chamber, vertical flues connecting the lower and tubular flues, a covering over the baking-chamber and supported by the tubular flues, a bearing above the tubular flues, a shaft hanging pendent from said bearing, a table supported by said shaft within the baking-chamber, and means for revolving said shaft and table in either horizontal direction.

5. An oven having a fire-box at one side, a lower flue leading from said fire-box, a vertical flue connecting with said lower flue, a baking-chamber above said lower flue and fire-box, horizontal metal flues supporting the top of said oven over the baking-chamber, a vertical revoluble shaft extending through the said top and hanging pendent therefrom in the baking-chamber, a table sustained by said pendent shaft, and means for revolving said shaft and table.

6. An oven having a fire-box, lower flues leading from the fire-box, a baking-chamber above the lower flues, metallic tubular flues extending through the top of the baking-chamber, metal bars on top of and sustained by said tubular flues, a covering for said baking-chamber which rests on said metal bars, I-beams extending at right angles to and sustained between its ends by said tubular flues, a center bearing-plate sustained by said beams and tubular flues, a hub above said bearing-plate and carrying a bevel-gear, a vertical shaft extending through and hanging pendent below said hub and bearing-plate and in the baking-chamber, a circular table carried by said pendent shaft, a horizontal shaft on top of the oven and having a gear to mesh with the gear on the hub, and an operating-wheel on the horizontal shaft by which the pendent shaft and table may be revolved.

In testimony whereof I affix my signature in presence of two witnesses.

GEORGE F. SMITH.

Witnesses:
CHAS. B. MANN,
FELIX R. SULLIVAN.